United States Patent [19]

Smith, III

[11] Patent Number: 4,915,419

[45] Date of Patent: Apr. 10, 1990

[54] SLIDING LOCK PLATE FOR HYDRAULIC CONNECTORS

[75] Inventor: Robert E. Smith, III, Stafford, Tex.

[73] Assignee: National Coupling Company, Inc., Houston, Tex.

[21] Appl. No.: 264,160

[22] Filed: Oct. 28, 1988

[51] Int. Cl.$^4$ ............................................. F16L 37/08
[52] U.S. Cl. ................................ 285/26; 285/137.1; 285/305; 285/920
[58] Field of Search ..................... 285/26, 25, 24, 29, 285/28, 27, 131, 137.1, 305, 920; 166/338, 340, 366

[56] References Cited

U.S. PATENT DOCUMENTS

| | | | |
|---|---|---|---|
| 2,087,418 | 7/1937 | Campbell | 285/131 |
| 3,527,480 | 9/1970 | Larson | 285/137.1 |
| 3,929,356 | 12/1975 | DeVincent et al. | 285/305 |
| 4,076,279 | 2/1978 | Klotz | 285/26 |
| 4,089,549 | 5/1978 | Vyse et al. | 285/137.1 |
| 4,426,104 | 1/1984 | Hazelrigg | 285/26 |
| 4,439,068 | 3/1984 | Pokladnik | 166/338 |
| 4,666,187 | 5/1987 | Koot | 285/27 |
| 4,694,859 | 9/1987 | Smith, III | 285/917 |
| 4,754,780 | 7/1988 | Smith, III | 285/900 |
| 4,813,716 | 3/1989 | Lalikos et al. | 285/305 |

FOREIGN PATENT DOCUMENTS 58394  1/1975  Australia ............................ 285/305

*Primary Examiner*—Randolph A. Reese
*Assistant Examiner*—Anthony Knight
*Attorney, Agent, or Firm*—Arnold, White & Durkee

[57] ABSTRACT

An apparatus for locking together simultaneously one or more male and female coupling members is disclosed, primarily for use in undersea hydraulic applications. The apparatus comprises a sliding lock plate supported by a first junction plate, the plate being slideable perpendicular to the coupling axis between an unlocked position and a locked position. The sliding lock plate has a number of passages configured to receive each coupling member therethrough in the unlocked position. In the locked position, the passages are configured to engage the circumference of the male and female coupling members and restrict axial movement of the members.

11 Claims, 4 Drawing Sheets

SLIDING LOCK PLATE FOR HYDRAULIC CONNECTORS

BACKGROUND OF THE INVENTION

1. Field of the Invention

The present invention relates to hydraulic couplings used in undersea drilling and production applications and junction plates used to support the opposing members of the coupling. More particularly, the invention involves a sliding lock plate for restraining axial movement of the male and female coupling members, which can be connected or disconnected simultaneously from one or more coupling members.

2. Description of the Related Art

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling.

Subsea hydraulic couplings are shown, for example, in U.S. Pat. Nos. 4,694,859 and 4,754,780 to Robert E. Smith, III, assigned to National Coupling Co., Inc. of Stafford, Tex.

The male member includes a cylindrical body having an outer diameter approximately equal to the diameter of the large female bore, and a connection at its other end to facilitate connection to hydraulic lines. When the cylindrical body of the male member is inserted into the large bore of the female member, according to various embodiments of the device, fluid flow is established between the male and female members.

A male member and female member are generally connected to opposing junction plates of a manifold and are held together by bolts or hydraulic members attached to the plates. The male member is commonly attached to one junction or manifold plate, while the female member is attached to an opposing plate so as to face the male member and align with it. The male and female members may be attached to the junction or manifold plates using various means, such as set screws or threads. Techniques for attaching the members to such plates are well-known to those skilled in the art.

Typically, several subsea hydraulic connectors are grouped together on each junction or manifold plate. For example, between ten and thirty coupling members may be attached to each opposing plate. In the subsea environment, a diver is required to connect the opposing plates together, and thereby connect the opposing coupling members on the plates. The coupling members are simultaneously connected and the opposing plates are locked together.

High separational forces are transferred to the opposing junction plates, due to the separational forces of the high pressure fluid in each coupling member. In many cases, the plates must be relatively thick and heavy in order to withstand high separational forces. For example, the plates are typically stainless steel and between 1 - 1 ½ inches in thickness.

The weight and thickness of the stainless steel plates present certain problems. To handle each heavy plate, several divers are required, and a wire line and/or cable and hoist also may be required to move and position the plate. Additionally, even with relatively heavy, thick manifold plates, it is impossible to completely eliminate relative axial or longitudinal movement between each of the coupling members. Warping of the plates may result in displacement of the male member with respect to the female member, resulting in loss of fluid communication between the coupling members. This displacement can be a serious problem, especially with subsea hydraulic couplings grouped together on opposing manifold plates.

Attempts have been made in the past to eliminate or reduce the problems due to high separational forces of the couplings and reduce the thickness and weight of the manifold plates. One solution that has been proposed is to individually lock together the male and female member in each of the hydraulic connectors, rather than locking only the plates together. In a subsea environment, however, individually connecting each of the hydraulic coupling members together can be an extremely difficult and time consuming undertaking.

Another proposed solution is lock sleeves for the subsea hydraulic connectors. The lock sleeves simultaneously lock together each of several couplings grouped together on opposing junction plates. The lock sleeve is pulled back axially to release balls inside the female half of the connector and thereby permit interconnection of the male half of the connector with the female member. After the male member has entered and seated in the female member, the lock sleeve is released, allowing the balls to reposition in the female and lock the male member and female member together. All of the lock sleeves are connected to a plate interposed between the male and female plates. As the intermediate plate is pulled back, all of the lock sleeves are simultaneously pulled back from the female coupling members. When the intermediate plate is released, the lock sleeve allows the balls to reposition in the female members and thereby lock each of the male members. The intermediate plate includes a handle that is used to move the intermediate plate axially to pull back and release each of the sleeves.

The lock sleeve system described above, however, has a number of disadvantages. The lock sleeve system is relatively heavy and bulky, which is undesirable in the subsea environment. Additionally, the lock sleeve system requires substantial vertical clearance sufficient to allow for the longitudinal movement of the intermediate plate. Other problems are caused by a build-up of silt, ocean debris and marine growth in the lock sleeve. The build-up may result in jamming the lock sleeves and especially the small locking balls. The connectors therefore cannot be released without great difficulty after a period of time subsea. Therefore, a reliable solution is needed for the problem of simultaneously locking together each subsea connector and that can easily be handled by a diver in the subsea environment.

SUMMARY OF THE INVENTION

The present invention overcomes the above-mentioned problems and disadvantages by providing a sliding lock plate having a plurality of channels configured to simultaneously lock together the male and female coupling members. The plate locks the members by sliding perpendicular to the axis of each coupling from a first position to a second position. Each channel in the plate includes a first end configured for insertion of a first coupling member therethrough and a second end configured to engage the body of both the first coupling member and the second coupling member and restrict axial movement of those members.

The advantages of the present invention include simplicity, high reliability, and light weight. Another advantage of the present invention is that it is less bulky than the prior art. The present invention requires less vertical clearance than the lock sleeve system.

The present invention may be used with aluminum junction plates or manifold plates having light weight and thickness. With the present invention, the aluminum junction plates may be approximately ¼ inch in thickness, rather than 1 to 1 ½ inches of stainless steel as is typical in the prior art.

Still another advantage of the present invention is that it will not tend to jam up with silt, ocean debris and marine growth during use. This improves reliability over the prior art.

DETAILED DESCRIPTION OF A PREFERRED EMBODIMENT

Figure 1:
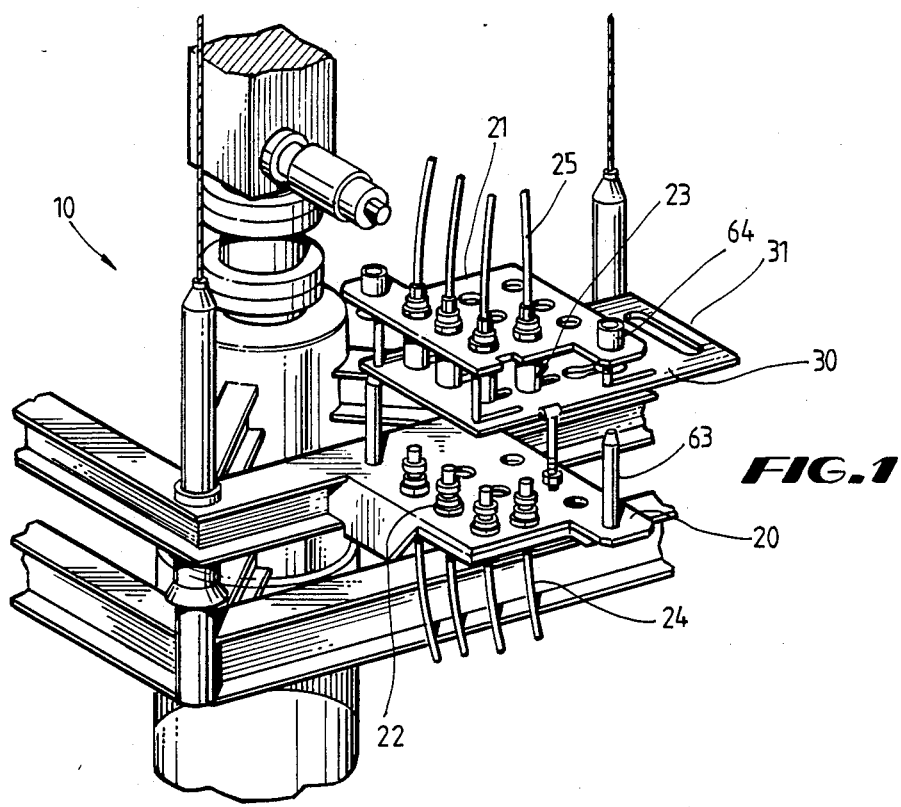
FIG. 1 is a perspective view of a plurality of male and female coupling members attached to opposing junction plates, with the male plate connected to a subsea wellhead assembly.

FIG. 1 is a perspective view of a wellhead assembly 10 which is commonly used in connection with undersea hydraulic couplings. The couplings are generally connected to opposing plates of the manifold and one of the plates is attached to the wellhead assembly, while the opposing plate is positionable by the diver subsea. As shown in FIG. 1, the male manifold plate or junction plate 20 is attached to the subsea wellhead assembly 10. It will be understood by those skilled in the art that either plate may be fixed to the wellhead assembly while the other plate is moveable. Attached to the male junction plate 20 are a number of male coupling members 22. Typically, between ten and thirty coupling members are attached to a single junction plate. It is preferred that the junction plate be made of aluminum or other suitable material having the advantage of light weight. The male hydraulic line 24 is connected to one end of the male coupling member 22, while the other end of the male coupling member is configured to mate with a female coupling member 23 and establish fluid flow therebetween.

As shown in FIG. 1, female coupling members 23 are connected to female manifold plate or junction plate 21. One end of each of the female coupling members 23 is connected to female hydraulic line 25. Guide means is provided to align the male junction plate and female junction plate, and in a preferred embodiment comprises a pin 63 and mating ring 64 which may be used to assist the diver during the engagement of the male and female members.

Also shown in FIG. 1 is sliding lock plate 30 which is secured to and supported by one of the junction plates. In a preferred embodiment, the sliding lock plate 30 is also aluminum secured to the female junction plate 21. However, it will be understood by those skilled in the art that the sliding lock plate also may be secured to the male junction plate. One end of the sliding lock plate includes handle 31 for ease of movement by the diver when it is connected and/or disconnected.

Figure 2:
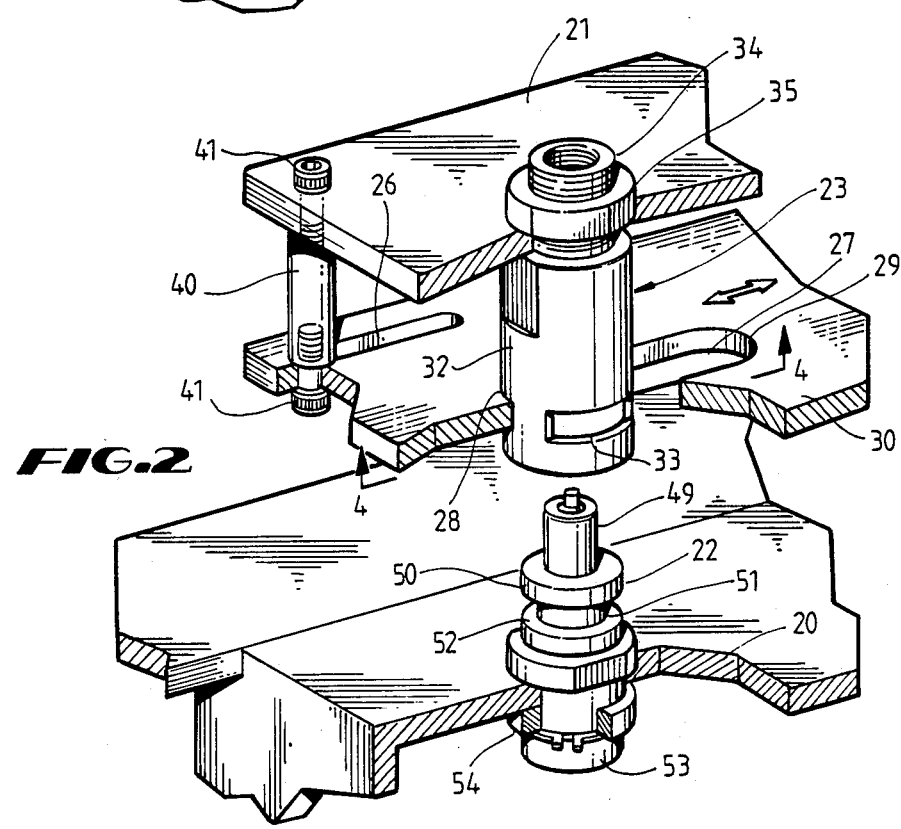
FIG 2 is a perspective view, partially in section, of a male coupling member and female coupling member, each member attached to a junction plate, with the sliding lock plate interposed between the plates in the unlocked position.

Now turning to FIG. 2, a male coupling member 22 and female coupling member 23 are shown connected to opposing junction plates 20 and 21. The female coupling member 23 includes an outer body 32, a connecting end 34 (preferably threaded) and a washer 35 for securing the member to the female junction plate 21. Similarly, male coupling member 22 includes a connecting end 53 and a washer 54 for securing the male coupling member to the male junction plate 20. It will be understood that, according to the present invention, various other means for connecting either the male or female coupling member to each junction plate may be provided.

The male coupling member includes a male probe end 49 for insertion into the central bore of the female, flanges 50 and 52 positioned along the probe end, and a circumferential groove 51 between the flanges. The circumferential groove 51 is adapted to secure the male coupling member from axial movement when the sliding lock plate 30 is in the locked position. A circumferential groove 33 is included in the female coupling member for restricting the female coupling member from axial movement when the sliding lock plate 30 moves into the locked position.

The sliding lock plate 30 is interposed between the male junction plate 20 and the female junction plate 21 and may be secured to either the male or the female junction plate. To secure the plate, in a preferred embodiment internally threaded support sleeve 40 and threaded connectors 41 on either end of the support sleeve permit sliding movement of the support sleeve within slot 26 as the plate moves between the first position and second position.

Figure 3:
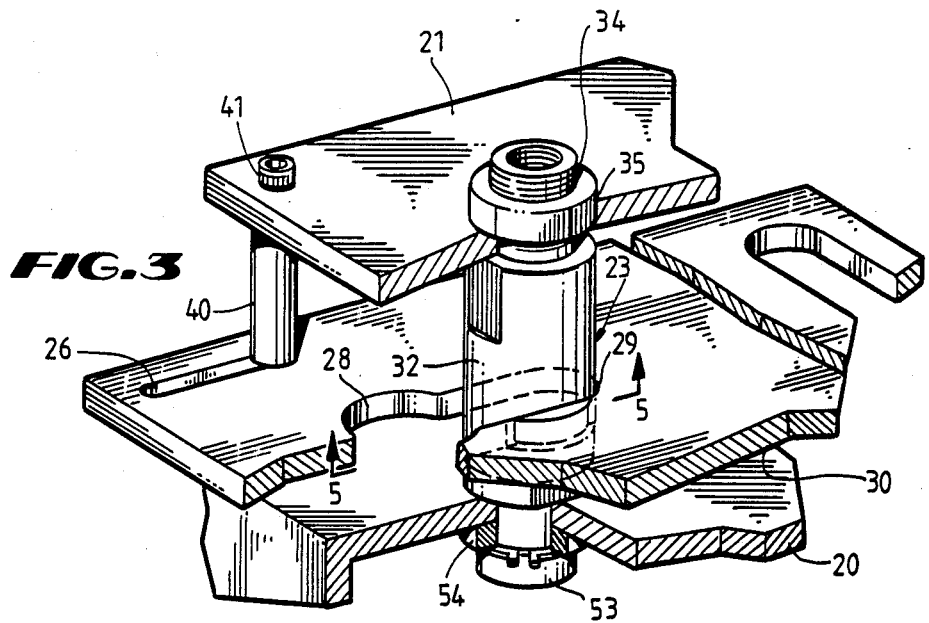
FIG. 3 is a perspective view, partially in section, of a single male and female coupling member, each member attached to a junction plate, with the sliding lock plate interposed therebetween in the locked position.

A channel 27 in the sliding lock plate is used for locking the coupling members axially together. As shown in FIG. 3, the channel includes a first end 28 which receives the male and female coupling members therethrough. The second end 29 of the channel 27 is configured to axially lock both of the coupling members. The second end restricts axial movement by sliding the channel simultaneously to position circumferentially about the groove 33 in the female member and the groove 51 in the male member.

Figure 6:
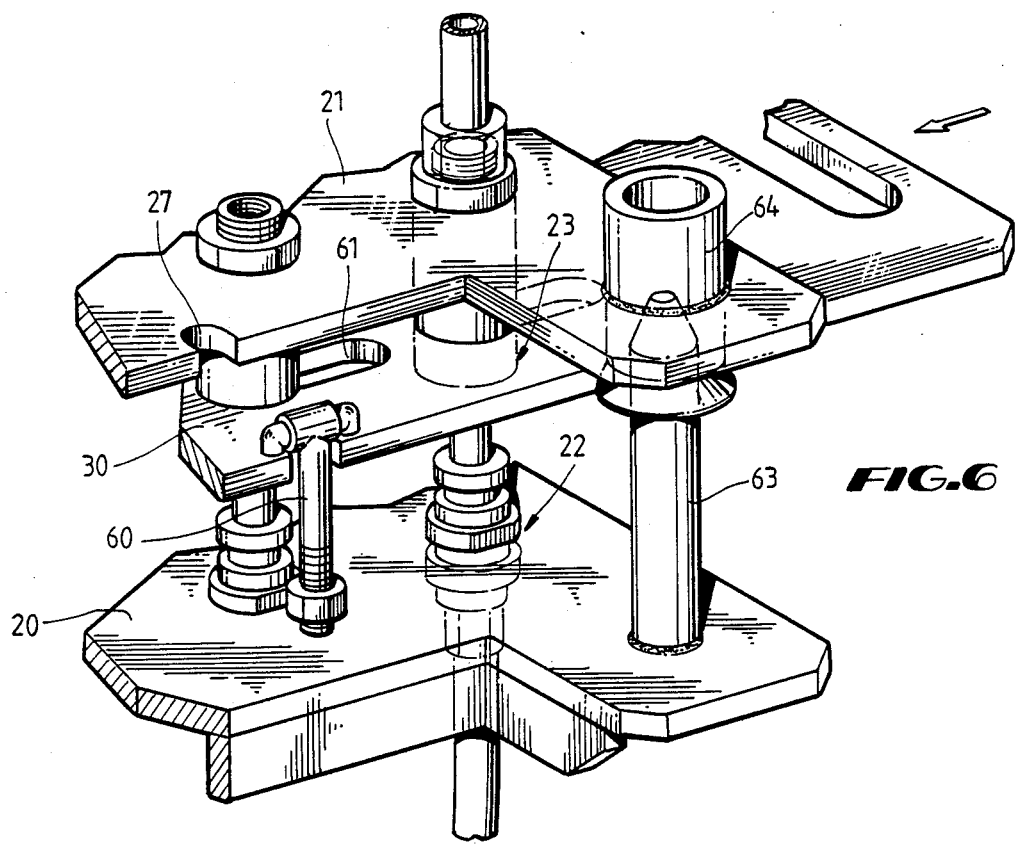
FIG. 6 is a perspective view, partially in section, of a portion of the sliding lock plate showing the alignment means with the latch in the unlocked position.

As shown in FIG. 3, the male member 22 and female member 23 are shown with the sliding lock plate 30 in the locked position. The threaded support sleeve 40 slides along the slot 26. At the same time the narrow portion 29 of the channel 27 circumferentially locks around the grooves 33 and 51 in the body of each coupling member. When the sliding lock plate is in the locked position, each coupling member is restricted from axial movement. As shown in FIG. 6, a hinged latch 60 may be used to secure the sliding lock plate in the locked position.

Figure 4:
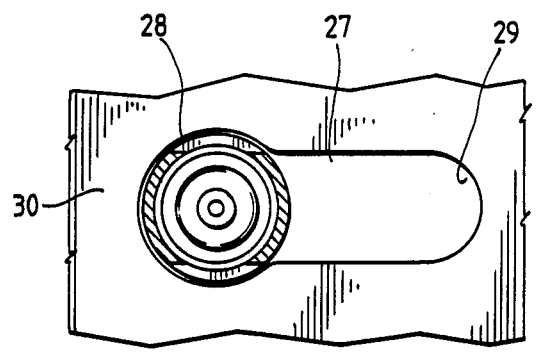
FIG. 4 is a cross-section view of the coupling member and sliding lock plate taken along the lines 4—4 in FIG. 2.
Figure 5:
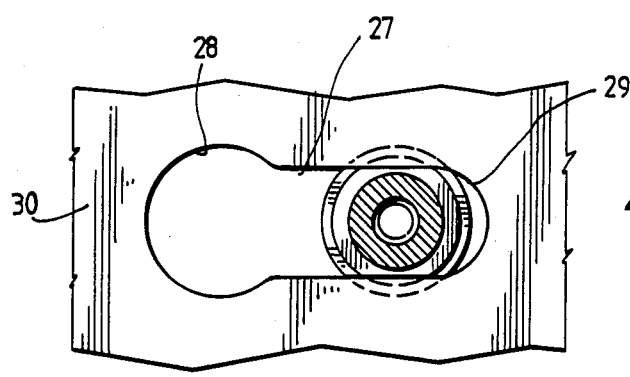
FIG. 5 is a cross-section view of the coupling member and the sliding lock plate taken along the lines 5—5 of FIG. 3.

Now referring to FIG. 4, taken along the cross-section of lines 4—4 in FIG. 2, the channel 27 includes a wide end 28 and a narrow end 29. One of the channels is provided for each coupling member in the assembly. In FIG. 5, it can be seen that the narrow portion 29 of the channel is configured to lock around the grooves 33 and 51 in the circumference of the male and female coupling members.

Figure 7:
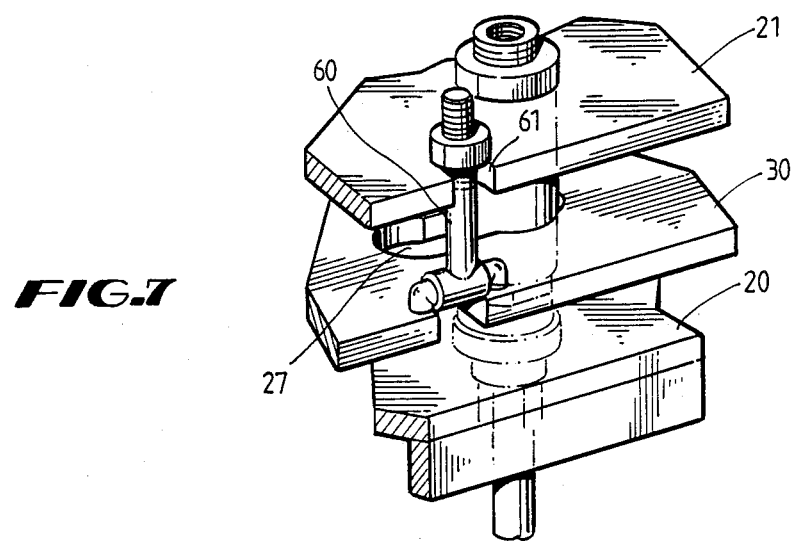
FIG. 7 is a perspective view, partially in section, of a portion of the sliding lock plate with the latch in the locked position.

The opposing plates may be guided together with the use of a mating pin on one plate and ring on the opposing plate. Now referring to FIG. 6, guide means comprises pin 63 and ring 64. The guide means serves to assist the diver in the alignment and engagement of each male member 22 and female member 23. Also shown in FIG. 6 is a hinged latch 60 which may be pivoted to engage slot 61 and secure the sliding lock plate 30 in the locked position shown in FIG. 7. In a first embodiment, as shown in FIG. 6, the hinged latch 60 is hinged to the sliding lock plate 30, and slot 61 is located on one edge of the female manifold plate 21.

Figure 8:
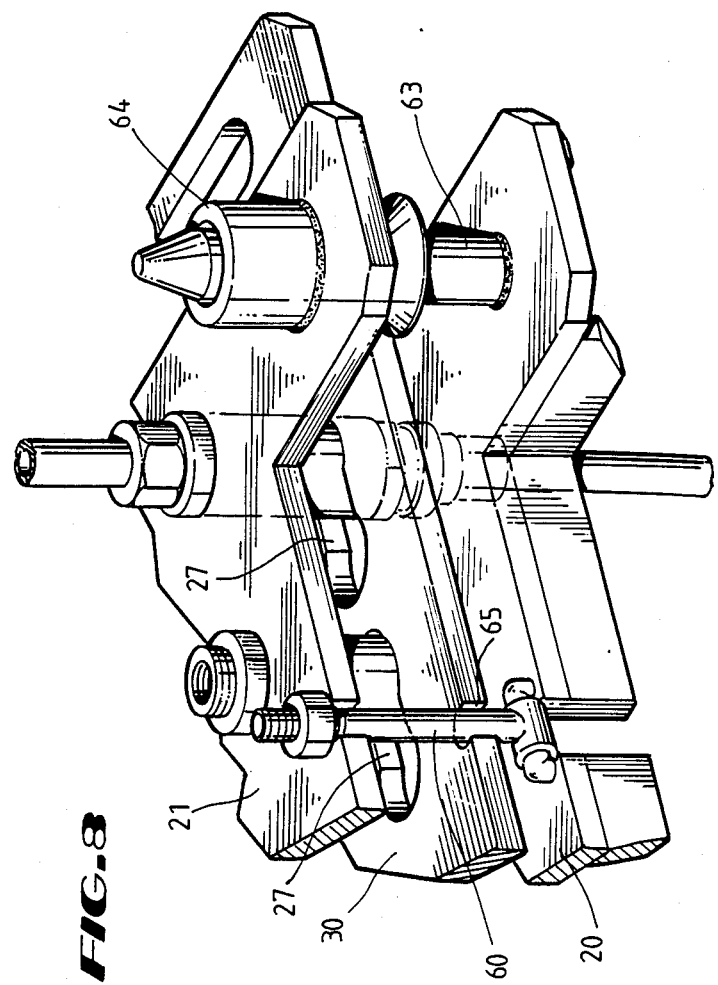
FIG. 8 is a perspective view, partially in section, of an alternative embodiment of the present invention, showing the alignment means with the latch in the locked position.

As shown in FIG. 8, in a second embodiment the hinged latch 61 is hinged to the male manifold plate 20 and pivots to secure the locking plate.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An apparatus for releaseably locking together a plurality of first and second coupling members comprising:
   a sliding lock plate positionable between the first and the second coupling members;
   a plurality of first coupling members, each member having a cylindrical body with a longitudinal axis and an outer groove in the body transverse to the longitudinal axis;
   a plurality of second coupling members engageable with the first coupling members to establish fluid communication therebetween, the second coupling members, each having a cylindrical body with a longitudinal axis and an outer groove in the body transverse to the longitudinal axis; and
   the sliding lock plate being slidable in a direction transverse to the longitudinal axis between a first position and a second position, the sliding lock plate having a plurality of channels extending therethrough configured to receive the second coupling members in the first position, the channels engageable with the grooves of the first and the second coupling members in the second position whereby axial movement of the first and second coupling members is restricted.

2. The apparatus according to claim 1 wherein the channel comprises a first wide portion and a second narrow portion.

3. The apparatus according to claim 1 further comprising a first junction plate on which the first coupling members are mounted, a second junction plate on which the second coupling members are mounted, and alignment means for aligning the first and the second junction plates and positioning the first and second coupling members.

4. The apparatus according to claim 3 whereby the sliding lock plate is interposed between and parallel with the first and second junction plates.

5. An apparatus for simultaneously locking together a plurality of couplings comprising:
   a first junction plate having a plurality of first coupling members attached thereto, each of the first coupling members having a cylindrical body and an outer groove transverse to the cylinder axis;
   a second junction plate having a plurality of second coupling members attached thereto, each of the second coupling members having a cylindrical body and an outer groove transverse to the cylinder axis, the second junction plate configured to align with the first junction plate whereby the first and the second coupling members are engageable to establish fluid communication therebetween; and
   a sliding lock plate supported by one of said junction plates in parallel relation thereto, the sliding lock plate being laterally slideable between a first unlocked position and a second locked position, and having a plurality of passages configured to receive the plurality of second coupling members therethrough in the first unlocked position, the passages engaging the outer grooves in the first and second coupling members and restricting axial movement of the coupling members when the sliding lock plate is in the second locked position.

6. The apparatus of claim 5 wherein the first coupling members have first and second circumferential flanges, the outer grooves axially positioned between the first and second flanges.

7. The apparatus of claim 5 wherein the first junction plate and the second junction plate further comprise guide means to position and align the coupling members in mating relationship.

8. The apparatus of claim 5 further comprising means for securing the sliding lock plate in the second position.

9. The apparatus of claim 5 wherein the sliding lock plate comprises a rectangular body having a handle at one end thereof, the passages having a circular portion adapted to receive therethrough the cylindrical body of the second coupling member, and an oblong portion configured to slideably fit around the outer groove of the second coupling member.

10. An apparatus for locking a first coupling member to a second coupling member, each of the coupling members having a cylindrical body with a longitudinal axis and an outer groove transverse to the axis, comprising:
   a sliding lock plate supported by the first coupling member, the sliding lock plate being laterally slideable between a first position and second position in a direction transverse to the longitudinal axis, the sliding lock plate further comprising an aperture having a first end configured for insertion of the second member therethrough in the first position, the aperture having a second end being configured to engage the outer groove of the first coupling member and the outer groove of the second coupling member and restrict axial movement of the coupling members in the second position;

guide means supported by the first and second coupling members for aligning the members in the first position; and means for securing the sliding lock plate in the second position.

11. The apparatus of claim 10 further comprising a first junction plate on which a plurality of first coupling members are mounted, a second junction plate on which a plurality of second coupling members are mounted, the sliding lock plate being interposed between the first junction plate and second junction plate, and having a plurality of apertures for insertion of the first coupling members therethrough in the first position; the apertures simultaneously engaging the outer grooves of the first coupling members and the second coupling members and restricting axial movement of the coupling members in the second position.

* * * * *